United States Patent [19]

Miroku

[11] Patent Number: 4,633,268

[45] Date of Patent: Dec. 30, 1986

[54] INK JET PRINTER

[75] Inventor: Yoshihiko Miroku, Ebina, Japan

[73] Assignee: Fuji Xerox Co., Ltd., Tokyo, Japan

[21] Appl. No.: 726,014

[22] Filed: Apr. 22, 1985

[30] Foreign Application Priority Data

May 23, 1984 [JP] Japan .............................. 59-104005

[51] Int. Cl.$^4$ .............................................. G01D 15/18

[52] U.S. Cl. .................................. 346/75; 346/140 R

[58] Field of Search .............................. 346/75, 140 IJ

[56] References Cited

U.S. PATENT DOCUMENTS 4,032,924 6/1977 Takano et al. ........................ 346/75

4,504,839 3/1985 Iyoda et al. .................... 346/140 IJ

OTHER PUBLICATIONS

Filmore, G. L., et al., "Drop Charging and Deflection In An Electrostatic Ink Jet Printer", IBM J. Res. Develop, Jan. 1977, pp. 37–47.

Kraus, John D., Sec. 7.14 "The Theory of Images", In Electromagnetics, Third Edition, McGraw Hill, New York, 1984.

*Primary Examiner*—George H. Miller, Jr.

*Attorney, Agent, or Firm*—A. Thomas S. Safford

[57] ABSTRACT

An ink jet printer is adapted to pass ink drops jetted from a nozzle of an ink head through a gap defined between parallel electrodes and to impart charges to these ink drops in the gap in response to video signals. Then, these ink drops are directed towards a record medium and their trajectories are deflected by passing the charged ink drops through a spacing defined between deflection electrodes, the ink drops being deflected in response to the quantity of electricity involved in the respective ink drops, whereby the ink drops impinge onto and adhere to the record medium at prescribed positions. The serial adhesions of the charged ink drops at suitable positions on the record medium, result in a desired image being recorded thereon. In this case, the parallel electrodes have a parallel distance related to the spacing λ between successive ink drops, so that the jet column is not electrically affected by the charge of the preceding ink drop on the basis of resultant electric field from the charge of the preceding ink drop and virtual charge of electric image thereof. This parallel distance, for example, can be expressed $d=0.77\lambda$.

9 Claims, 5 Drawing Figures

INK JET PRINTER

BACKGROUND OF THE INVENTION

This invention relates to an ink jet printer, and is more specifically directed to an improved ink jet printer wherein a gap or distance defined parallel electrodes for charging ink drops is suitably determined with respect to a spacing defined between droplets when the ink drops are formed serially, whereby influence of the charge of the preceding ink drop is minimized.

DESCRIPTION OF THE PRIOR ART

Ink jet printers have been known for recording information on record medium for computers and the like. According to such conventional ink jet printers, ink drops discharged from a nozzle pass through a gap defined between parallel electrodes to charge them, and the charged ink drops are allowed to collide against the record medium thereby effecting recording of information. In this case, the quantity of electricity in charging the ink drops is determined in response to video signals at the time of passing said ink drops through said parallel electrodes.

In such conventional ink jet printers, however, a certain ink drop in the serial ink drops discharged successively from a nozzle is affected by the charge of the preceding ink drop when the ink drop is charged by parallel charging electrodes. For this reason, it is difficult to afford charges to such ink drops in correct response to video signals so that it cannot be assured that when the ink drops collide against a record medium, they will do so at their proper prescribed positions and be correctly and precisely recorded on the medium.

In this connection, a remarkable advantage of the present invention resides in that each given ink drop of the successive serial ink drops discharged from a nozzle is not affected by charge of the preceding ink drop when the ink drop is charged by charging electrodes disposed in parallel to each other.

OBJECTS AND SUMMARY OF THE INVENTION

It is an object of the present invention to provide a novel and improved ink jet printer useful for printing various information such as characters, numerals, symbols, figures, diagrams and the like on a record medium in computer equipment, word processors, copying machines and the like.

In accordance with the present invention, a distance defined between parallel electrodes for charging ink drops on the trajectory from a nozzle to a record medium is determined so as to have an established relationship with respect to the spacing between droplets successively formed.

More specifically, in accordance with the present invention, the parallel electrodes may be located with a relationship expressed by $d=0.77\lambda$, where d is the distance between the parallel electrodes, and $\lambda$ is a spacing between (a) the extreme end of a jet column extending from the nozzle and (b) the preceding ink drop, based on the reasons described hereinbelow. In the present invention, the concept of electrical image may be introduced for constructing the parallel electrodes so they are properly spaced.

BRIEF DESCRIPTION OF THE DRAWINGS

For the purpose of illustrating the invention, there are shown in the accompanying drawings forms which are presently preferred, it being understood, however, that this invention is not limited to the precise arrangements and instrumentalities shown.

DETAILED DESCRIPTION OF THE INVENTION

Figure 1:
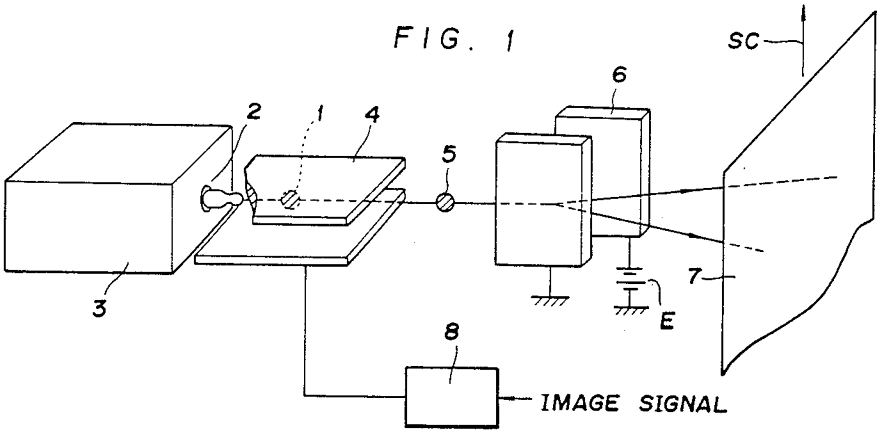
FIG. 1 is a constructional schematic diagram illustrating the ink jet printer according to an embodiment of the present invention.

Referring now in detail to the accompanying drawings, wherein like numerals identify like elements, there is shown in FIG. 1 a diagram of a system in accordance with the present invention for forming ink drops which have a precise quantity of electricity relative to video signals.

The ink jet printer according to the present invention shown in FIG. 1 comprises an ink jetting head 3 provided with a nozzle 2 for discharging an ink drop 1, electrodes 4 for charging the flying ink drop 1 in response to video signals, deflection electrodes 6 for deflecting an ink drop 5 charged by means of the charging electrodes 4 in response to a quantity of electricity to allow the ink drop to adhere on a paper 7, and a potential-controlling part 8 for applying charging voltage to the charging electrodes 4 in response to video signals (a gutter for recovering the ink drops 1 which have not been utilized for printing is not shown in FIG. 1).

Figure 2:
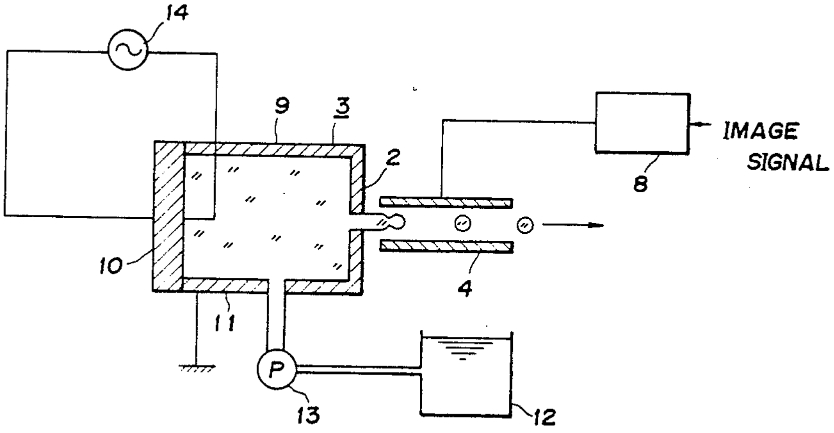
FIG. 2 is a block diagram showing particularly a part for forming ink drops in the ink jet printer according to the above embodiment of the invention.

The ink jetting head 3 comprises, as shown in FIG. 2, an ink reservoir 9 provided with the nozzle 2, and a piezo-vibrator 10 disposed at an end of the ink reservoir 9 opposite to the nozzle 2. Ink is supplied from an ink tank 12 to an ink chamber 11 defined in the ink reservoir 9 by means of a pump 13 so that constant static pressure is applied to the ink chamber 11. On the other hand, the piezo-vibrator 10 is ultrasonically vibrated by ultrasonic signals from an exciter 14.

In the above construction, the ink in the ink chamber 11 is excited by the vibration of the piezo-vibrator 10 so that the ink drops 1 are continuously discharged. In this case, charges corresponding to video signals are given to the discharged ink by means of the charging electrodes 4 when the discharged ink is converted from a jet column to the ink drops 1. The charged ink drops 5 are deflected by the deflection electrodes 6 in accordance with their respective quantity of electrical charge so that the deflected ink drops are allowed to adhere to the record medium 7 thereby to print the video information. The above operation is repeated until the printing of a line is completed, and upon completion of such printing, the paper 7 is shifted along the direction of arrow SC by a prescribed width.

Figure 3:
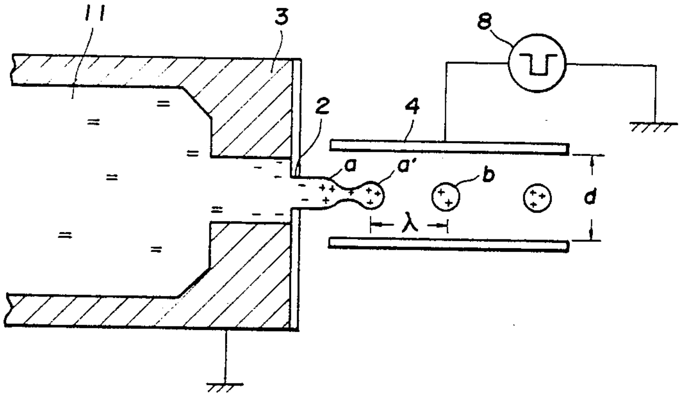
FIG. 3 is a block diagram illustrating a manner for affording charges to ink drops by utilizing the ink jet printer according to the embodiment of the present invention.

In these circumstances, a distance d between the opposite charged electrodes 4 in parallel to each other shown in FIG. 3 is selected as follows:

$d=0.77\lambda$, wherein $\lambda$ is a spacing between the extreme end of a jet column a and the preceding ink drop b.

Furthermore a manner in which the charged ink drop 5 is formed by applying pulse potential to the charging electrodes 4 in response to video signals of the pulse potential controlling part 8 will be described hereinbelow.

Namely, because of vibration of the piezo-vibrator 10 (FIG. 2), the ink in the ink chamber 11 is excited to form the jet column a at the nozzle 2. Then, the extreme end a' of the jet column a is separated by jet pressure derived from the ink chamber 11 to form the flying ink drop b.

At the time when said jet column a is formed, negative pulse potential is applied to the jet column by means of the pulse potential controlling part 8 in response to video signals. In this case, positive charge is induced to the jet column a, because the ink is conductive and the ink chamber 11 is grounded so that the ink drop b charged positively is formed in the case when the extreme end a' of the jet column a is separated.

The term "video signals" used herein is not limited to signals for merely expressing characters, but refers to signals involving any information such as characters, diagrams, picture images and the like to be expressed on a record medium.

According to the embodiment of the present invention as described above, the ink drop 1 jetted from the nozzle 2 is charged by the charging electrodes 4 with a quantity of electricity in response to video signals to form the charged ink drop 5. The charged ink drop 5 is directed to the paper 7, and then the charged ink drop is deflected by means of the deflection electrodes 6 placed on the way to the paper 7 in response to the quantity of electricity involved in the charged ink drop itself so that the ink drop 5 collides against the paper 7 and adheres thereto. Thus ink drops involving a variety of quantities of electricity are deflected by the deflection electrodes 6 an amount based on a precise quantity of electricity in response to video signals to successively collide against the paper 7 and to adhere thereto, whereby prescribed picture images (characters, diagrams, pictures and the like) can be formed on the paper 7.

As is apparent from the above description, it is possible in accordance with the present invention that the video signals involve information corresponding to positions on the record medium to which charged ink drops are intended to adhere, and that a correct quantity of electricity, not affected by the electric field of the preceding ink drop, can be afforded to the ink drops on the basis of said information.

For the embodiment illustrated in FIG. 1, the following conditions were observed:

| | | |
|---|---|---|
| (1) Ink Drop Generator | Frequency for Dropping | 100 kHz |
| | Diameter of Nozzle | 60 μm |
| | Flow Velocity | 30 m/S |
| | Spacing between Ink Drops (λ) | 300 μm |
| | Diameter of Ink Drop | 117 μm |
| (2) Charging Electrodes | Length of Electrodes | 1.5 mm |
| | Distance between Parallel Electrodes (d) | 230 μm |
| | Charging Potential (Voltage) | 0–100 V |

-continued

| | | |
|---|---|---|
| | Material of Electrodes | Silver |
| (3) Ink | Aqueous Dye Type | |
| | Conductivity | $10^{-4}$ ℧/cm |
| | Viscosity | 2 cp |

It was confirmed that the influence of the charge of the preceding ink drop on the following ink drop was practically negligible as a result of measuring the quantity of electricity of the ink drops under the above conditions.

Figure 4:
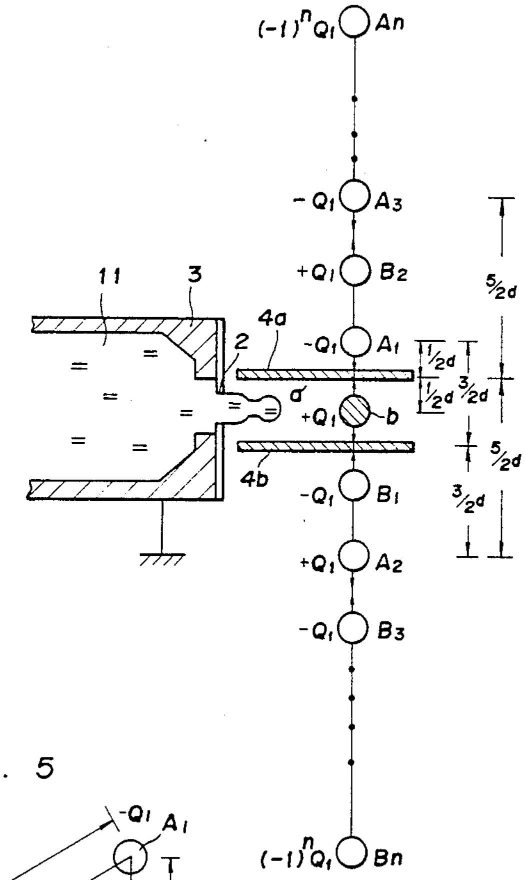
FIG. 4 is a view for illustrating principle of the operation in the embodiment of the present invention by introducing concept of electrical image thereinto.

In operation, electrical images $A_1$–$A_n$ as well as $B_1$–$B_n$ are imaged outside the parallel electrodes 4 as shown in FIG. 4. The influence of the positively charged ink drop b upon the ink column a' which is to be induced and charged is considered as follows.

FIG. 4 is an explanatory view illustrating the aforesaid electrical images $A_1$–$A_n$ as well as $B_1$–$B_n$ wherein the ink drop b passing through the central portion defined between an upper plate 4*a* and a lower plate 4*b* of the charging electrodes 4 goes straight without deflecting by either plate of the charging electrodes. Thus, primary electrical images $A_1$ and $B_1$ having a charge of the reverse polarity to that of the ink drop b (for example, $-Q_1$ in the present embodiment) are formed at symmetrical positions with respect to the upper and lower parallel electrode plate 4*a* and 4*b*. Then, secondary electrical images $A_2$ and $B_2$ having primary electrical images $A_1$ and $B_1$, so that the other virtual electrical images $A_n$ and $B_n$ are successively produced.

Figure 5:
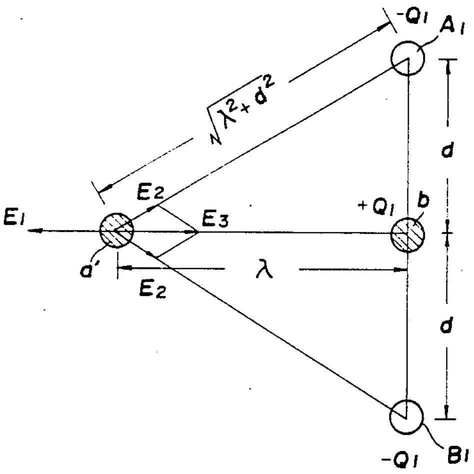
FIG. 5 is a view for explaining the principle of operation in the embodiment of the invention by considering electric field with respect of two successive ink drops.

FIG. 5 is a view for examining the influence in an electric field of the primary electrical images $A_1$ and $B_1$ upon the extreme end a' of the jet column a. For instance, intensity of electric field $E_2$ which is given to the extreme end a' of the jet column by the primary electrical image $A_1$ (electricity is $-Q_1$) may be expressed as follows, since a distance $a'-A_1$ is $\sqrt{\lambda^2+d^2}$:

$$E_2 = \frac{1}{4\pi\epsilon_o} \cdot \frac{-Q_1}{(\sqrt{\lambda^2+d^2})^2}$$

Likewise the intensity of electric field $E_2$ acts also upon the primary electric image $B_1$ (electric charge is $-Q_1$) so that intensity of electric field $E_3$ in which the electric images $A_1$ and $B_1$ function on the extreme end a' of the jet column is expressed by the following equation:

$$E_3 = 2E_2 \cos\theta = \frac{2}{4\pi\epsilon_o} \cdot \frac{-Q_1}{(\sqrt{\lambda^2+d^2})^2} \cdot \frac{\lambda}{\sqrt{\lambda^2+d^2}}$$

Then, intensity of electric field $E_1$ which is given to the extreme end a' of the jet column by the ink drop b of charge $+Q_1$ is as follows:

$$E_1 = \frac{1}{4\pi\epsilon_o} \cdot \frac{Q_1}{\lambda^2}$$

so that influence of the ink drop b is cancelled in the case where the intensity of electric field $E_1$ balances that of electric field $E_3$. As a result, $$E = E_1 + E_3$$

-continued $$= \frac{Q_1}{4\pi\epsilon_o}\left( \frac{1}{\lambda^2} - \frac{2}{\lambda^2 + d^2} \cdot \frac{\lambda}{\sqrt{\lambda^2 + d^2}} \right)$$

= 0, and distance $d$ between the parallel electrodes becomes as follows:

$$d = \sqrt{2^{\frac{2}{3}} - 1} \cdot \lambda \approx 0.77\lambda$$

On the hand, secondary, tertiary, quartenary, . . ., and nth order electrical images may also be similarly considered in addition to the primary one, but they are negligible, because the influence of them is very small as compared to that of the primary electrical image. In other words, if 0.77 times larger spacing than distance between droplets is selected in determining the distance between the parallel electrodes, the electrical influence of the preceding ink drop b during the charging step can be ignored.

While not only the electrical image of the preceding ink drop b, but also that of the ink drop prior to the preceding one, etc., may be considered, such electric field acting on the extreme end a' of the ink a is negligible, because such distance in the latter case is far larger than that in case of the preceding drop b. Thus, according to the ink jet printer of the present invention, there is no need of additional equipments such as correcting means and the like.

It will be apparent to those skilled in the art that various changes and modifications may be made within the spirit of the above teachings. For example, although the operation has been disclosed in detail with respect to one nozzle ink head, it is apparent that multiple nozzle ink head for color system could be used as well. Various other types of ink head may be used to form ink drops and various other charging electrodes and driving techniques thereof may be used. Furthermore the illustration of the embodiment of the ink jet printer is only a selected example, and it is apparent that many variations may be made within the spirit of the present invention.

Although the distance d is decided as

"$d=0.77\lambda$", it is confirmed that the distance d is acceptable in the following equation in a practical use of an ink jet printer.

"$d=0.75\lambda-0.79\lambda$"

The acceptable tolerance of $\pm 0.02\lambda$ with respect to the optimum gap distance d between the parallel electrodes of $0.77\lambda$ for an actual operating ink jet printer is determined based on the following design parameters, the basis for the selection of which is evident to those skilled in the art:

| | |
|---|---|
| Distance between nozzle and recording medium | 18 mm |
| Ink drop diameter | 60 μm |
| Any charge distortion | ±40 μm |

The parameter of any charge distortion is first established by the capacity of the ink jet printer. Thereafter, the parameters of gap between the parallel electrodes, the diameter of the ink drops and the distance between the nozzle and the recording medium are determined so as to satisfy the any charge distortion parameter.

In view of the above, the present invention may be embodied in other specific forms without departing from the spirit or essential attributes thereof and accordingly, reference should be made to the appended claims, rather than to the foregoing specification as indicating the scope of the invention,

What is claimed is:

1. An ink jet printer of the type in which ink jet means for jetting ink drops serially from a nozzle of an ink head thereby, and means for directing the ink drops towards a record medium, and wherein said ink drops are allowed to adhere to said record medium at prescribed positions, whereby a desired image is formed on said record medium, comprising:

parallel electrodes for charging, in response to video signals applied to said parallel electrodes, said respective ink drops jetted from said nozzle passing through a gap defined between said parallel electrodes, and deflection electrodes for deflecting said parallel drops charged by passing through the gap of said parallel electrodes in response to a quantity of electric charge thereon to locate said ink drops at desired positions on said record medium, the gap between said parallel electrodes being determined relative to the spacing between successive ink drops such that an ink drop to be charged is not substantially affected by the charge of the preceding ink drop which has already been charged.

2. An ink jet printer as claimed in claim 1 wherein a gap or distance d defined between said parallel electrodes is expressed by the following equation:

$$0.79 \geqq \frac{d}{\lambda} \geqq 0.75$$

wherein λ is a spacing defined between successive ones of said serially formed ink drops.

3. An ink jet printer as claimed in claim 2, wherein $d=0.77\lambda$.

4. An ink jet printer as claimed in claim 1, wherein said ink drops are conductive.

5. An ink jet printer as claimed in claim 1, wherein said jet means includes a piezo-vibrator associated with said ink head for jetting the ink drops from said nozzle, and excitation means for driving said piezo-vibrator.

6. An ink jet printer as claimed in claim 2, wherein said ink drops are conductive.

7. An ink jet printer as claimed in claim 2, wherein said jet means includes a piezo-vibrator associated with said ink head for jetting said ink drops from said nozzle, and excitation means for driving said piezo-vibrator.

8. An ink jet printer as claimed in claim 4, wherein said jet means includes a piezo-vibrator associated with said ink head for jetting said ink drops from said nozzle, and excitation means for driving said piezo-vibrator.

9. An ink jet printer as claimed in claim 6, wherein said jet means includes a piezo-vibrator associated with said ink head for jetting said ink drops from said nozzle, and excitation means for driving said piezo-vibrator.

* * * * *